US008896699B2

(12) United States Patent
Kasuga et al.

(10) Patent No.: US 8,896,699 B2
(45) Date of Patent: Nov. 25, 2014

(54) IMAGE SYNTHESIS DEVICE

(75) Inventors: Takafumi Kasuga, Tokyo (JP); Yoshiyuki Kato, Tokyo (JP); Kiyotaka Kato, Tokyo (JP); Akira Torii, Tokyo (JP); Masaki Hamada, Tokyo (JP); Eisuke Yonezawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/808,985

(22) PCT Filed: Jul. 14, 2010

(86) PCT No.: PCT/JP2010/004573
§ 371 (c)(1),
(2), (4) Date: Jan. 8, 2013

(87) PCT Pub. No.: WO2012/007993
PCT Pub. Date: Jan. 19, 2012

(65) Prior Publication Data
US 2013/0107055 A1 May 2, 2013

(51) Int. Cl.
*H04N 7/18* (2006.01)

(52) U.S. Cl.
CPC ..................... *H04N 7/181* (2013.01)
USPC .......................................... 348/148; 348/118

(58) Field of Classification Search
CPC ........................ H04N 5/225; H04N 2005/225
USPC ................................................ 348/118, 148
See application file for complete search history.

(56) References Cited

U.S. PATENT DOCUMENTS 7,161,616 B1 * 1/2007 Okamoto et al. ............. 348/148
7,511,734 B2 3/2009 Ozaki
(Continued)

FOREIGN PATENT DOCUMENTS

DE  10 2005 018 361 A1  12/2005
JP  2005 311698          11/2005
(Continued)

OTHER PUBLICATIONS

Office Action issued May 7, 2013 in German Patent Application No. 11 2010 005 737.0 with English language translation.
International Search Report Issued Oct. 26, 2010 in PCT/JP10/04573 Filed Jul. 14, 2010 Ax Ay.

*Primary Examiner* — Sath V Perungavoor
*Assistant Examiner* — Jeffery Williams
(74) *Attorney, Agent, or Firm* — Oblon, Spivak, McClelland, Maier & Neustadt, L.L.P.

(57) ABSTRACT

Disclosed is an image synthesis device including an area determining unit 3 for selecting a vehicle-mounted camera 1 used for generation of a bird's-eye view image viewed from an arbitrary point of view from vehicle-mounted cameras 1a to 1d mounted at different positions, and for determining an area corresponding to the bird's-eye view image in an image captured by the vehicle-mounted camera 1, and an input video signal control unit 4 for receiving image data about the area determined by the area determining unit 3, the image data being included in image data showing the image captured by the vehicle-mounted camera 1, to store the image data in an input frame buffer 5, in which an image processing device 6 generates a bird's-eye view image from the image data stored in the input frame buffer 5.

7 Claims, 7 Drawing Sheets

(56) References Cited

U.S. PATENT DOCUMENTS

| | | |
|---|---|---|
| 7,734,417 B2 | 6/2010 | Chinomi et al. |
| 2005/0238203 A1 | 10/2005 | Yoshimura |
| 2006/0197761 A1 | 9/2006 | Suzuki et al. |
| 2006/0227138 A1 | 10/2006 | Oizumi |
| 2007/0041659 A1 | 2/2007 | Nobori et al. |

FOREIGN PATENT DOCUMENTS

| | | |
|---|---|---|
| JP | 2006 277738 | 10/2006 |
| JP | 2006 287826 | 10/2006 |
| JP | 2007 214769 | 8/2007 |
| JP | 2009 152966 | 7/2009 |
| WO | 00 64175 | 10/2000 |

* cited by examiner

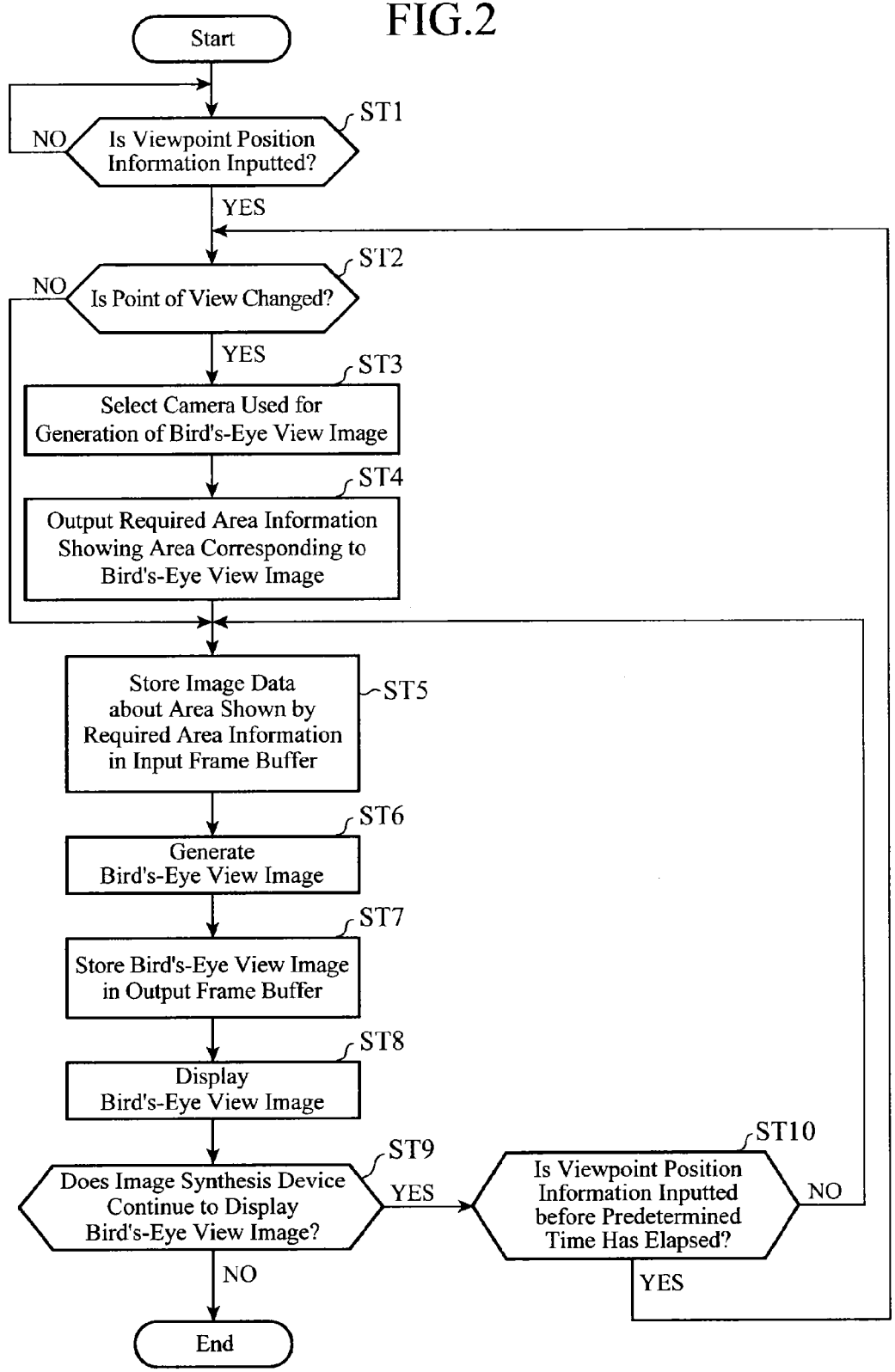

FIG.3 (a)

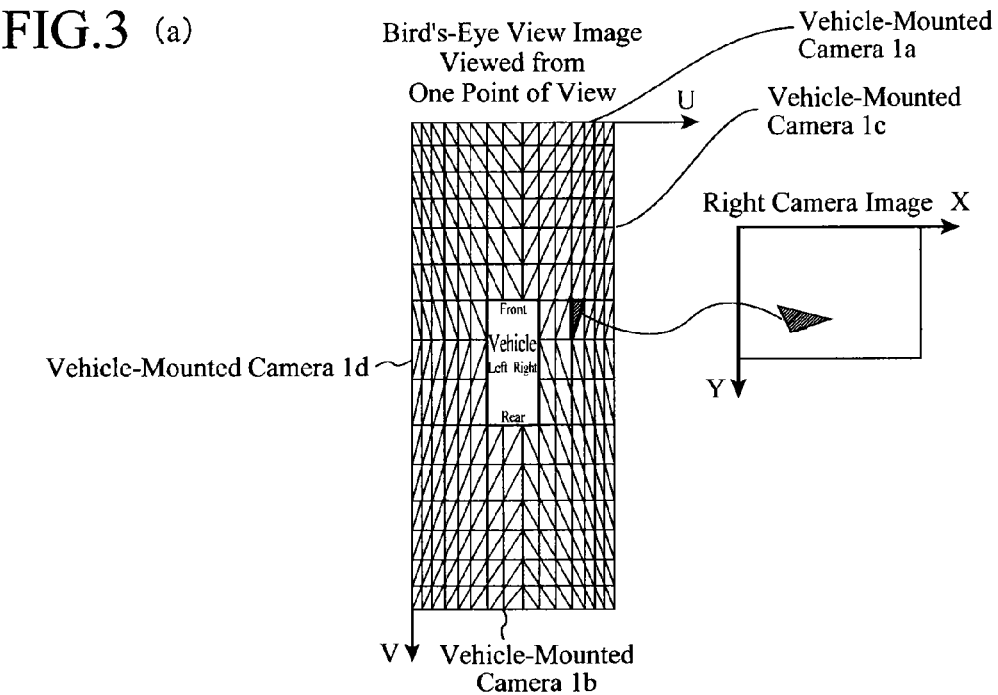

(b) Rearrangement Table Corresponding to the Point of View (1) 0th Area
(1)-1 Vehicle-Mounted Camera Information 1a
(1)-2 Area Vertex Coordinates
$(u_0(0), v_0(0))=(0,0)$
$(u_1(0), v_1(0))=(0,10)$
$(u_2(0), v_2(0))=(5,10)$
(1)-3 Coordinate Transformation Matrix M(0)
$\vdots$ (n)nth Area
(n)-1 Vehicle-Mounted Camera Information 1c
(n)-2 Area Vertex Coordinates
$(u_0(n), v_0(n))=(200,100)$
$(u_1(n), v_1(n))=(200,105)$
$(u_2(n), v_2(n))=(205,105)$
(n)-3 Coordinate Transformation Matrix M(n)
$\vdots$ (T-1)(T-1)th Area
(T-1)-1 Vehicle-Mounted Camera Information 1d
(T-1)-2 Area Vertex Coordinates
$(u_0(T-1), v_0(T-1))=(290,490)$
$(u_1(T-1), v_1(T-1))=(290,500)$
$(u_2(T-1), v_2(T-1))=(300,500)$
(T-1)-3 Coordinate Transformation Matrix M(T-1)

IMAGE SYNTHESIS DEVICE

FIELD OF THE INVENTION

The present invention relates to an image synthesis device that generates a bird's-eye view image viewed from an arbitrary point of view in the neighborhood of a vehicle from an image captured by a camera mounted to a peripheral portion of the vehicle, and displays the bird's-eye view image.

BACKGROUND OF THE INVENTION

For example, an image synthesis device disclosed by the following patent reference 1 receives image data showing images captured by a plurality of cameras mounted to a peripheral portion of a vehicle, and stores the image data in an input frame buffer. This image synthesis device refers to mapping data showing a correspondence between pixels in a bird's-eye view image viewed from an arbitrary point of view and pixels in each of the images captured by the cameras to generate a bird's-eye view image from the plurality of image data stored in the input frame buffer.

When generating a bird's-eye view image from the plurality of image data stored in the input frame buffer, the above-mentioned image synthesis device uses only the image data about an area in each of the images captured by the cameras but does not the image data about any area other than the above-mentioned area while storing all the image data showing the images captured by the cameras in the input frame buffer. Therefore, the input frame buffer disposed in the above-mentioned image synthesis device needs to have a large memory size.

An image synthesis device disclosed by the following patent reference 2 includes a special camera installed on an object and capable of changing an output area, and controls the output area of the camera according to the point of view of a bird's-eye view image (controls the range of an image captured by the camera) in order to be able to store only image data used for generation of a bird's-eye view image in an input frame buffer and reduce the memory size of the input frame buffer.

RELATED ART DOCUMENT

Patent Reference

Patent reference 1: WO00/064175 (p. 5)
Patent reference 2: Japanese Unexamined Patent Application Publication No. 2006-287826 (paragraph number [0020])

SUMMARY OF THE INVENTION

Because the conventional image synthesis devices are constructed as above, only the image data used for the generation of a bird's-eye view image can be stored in the input frame buffer and therefore the memory size of the input frame buffer can be reduced as long as a special camera capable of changing an output area is installed and the output area of the camera is controlled according to the point of view of the bird's-eye view image. A problem is, however, that in a case in which a special camera capable of changing an output area cannot be installed for reasons of equipment cost and camera specifications, a bird's-eye view image viewed from an arbitrary point of view cannot be generated unless an input frame buffer having a large memory size is installed (giving permission for degradation in the image quality of a bird's-eye view image and for reduction in the frame rate enables a bird's-eye view image viewed from an arbitrary point of view to be generated even if an input frame buffer having a small memory size is installed).

The present invention is made in order to solve the above-mentioned problem, and it is therefore an object of the present invention to provide an image synthesis device that can generate a bird's-eye view image having high quality and a high frame rate without having to install an input frame buffer having a large memory size.

In accordance with the present invention, there is provided an image synthesis device including: an area determining unit for selecting a camera used for generation of a bird's-eye view image viewed from an arbitrary point of view from a plurality of cameras mounted at different positions, and for determining an area corresponding to the bird's-eye view image in an image captured by the camera selected thereby; and an image data input unit for receiving image data about the area determined by the area determining unit, the image data being included in image data showing the image captured by the camera, to store the image data in a frame buffer, in which a bird's-eye view image generating unit generates a bird's-eye view image from the image data stored in the frame buffer.

Because the image synthesis device in accordance with the present invention is constructed in such a way that the image synthesis device includes the area determining unit for selecting a camera used for the generation of a bird's-eye view image viewed from an arbitrary point of view from the plurality of cameras mounted at different positions, and for determining an area corresponding to the bird's-eye view image in the image captured by the camera selected thereby, and the image data input unit for receiving image data about the area determined by the area determining unit, the image data being included in the image data showing the image captured by the camera, to store the image data in the frame buffer, and the bird's-eye view image generating unit generates a bird's-eye view image from the image data stored in the frame buffer, there is provided an advantage of being able to generate a bird's-eye view image having high quality and a high frame rate without having to install a frame buffer having a large memory size.

BRIEF DESCRIPTION OF THE FIGURES

FIG. 2 is a flow chart showing processing carried out by the image synthesis device in accordance with Embodiment 1 of the present invention;

FIG. 3 is an explanatory drawing showing an example of a point of view and a rearrangement table;

EMBODIMENTS OF THE INVENTION

Hereafter, in order to explain this invention in greater detail, the preferred embodiments of the present invention will be described with reference to the accompanying drawings.

Embodiment 1

Figure 1:
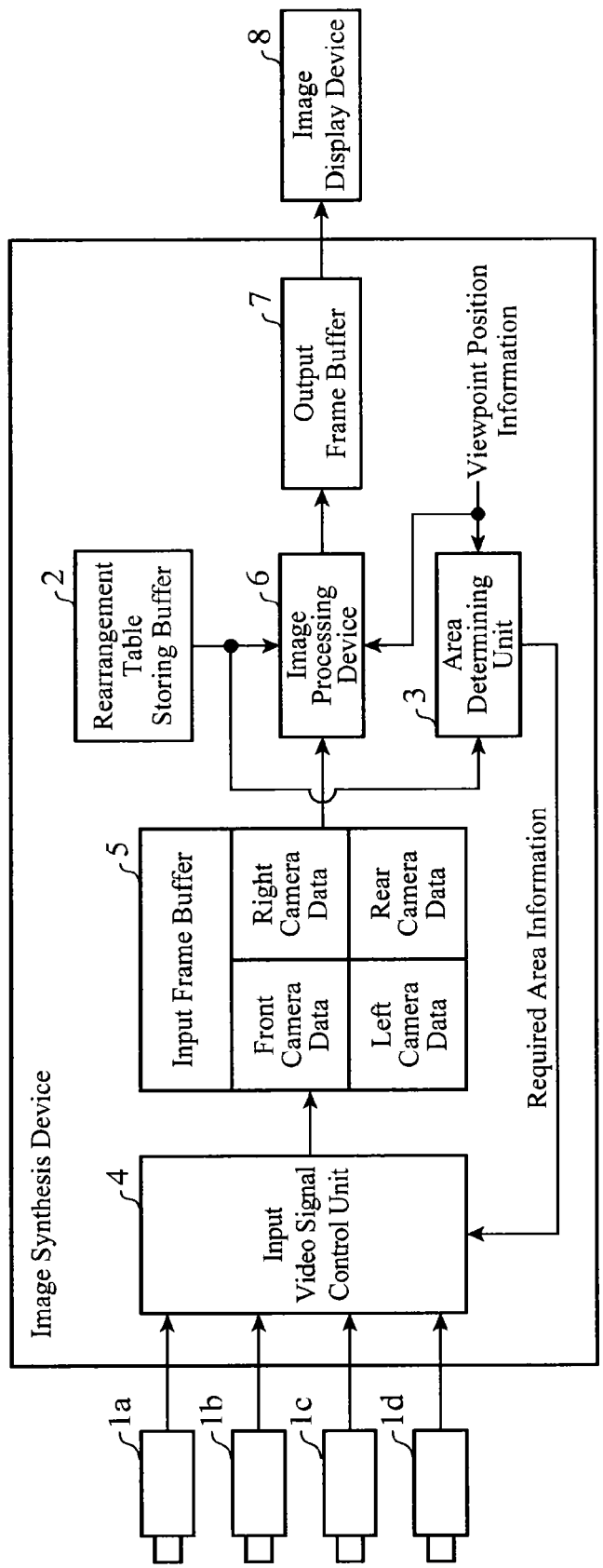
FIG. 1 is a block diagram showing an image synthesis device in accordance with Embodiment 1 of the present invention.
Figure 6:
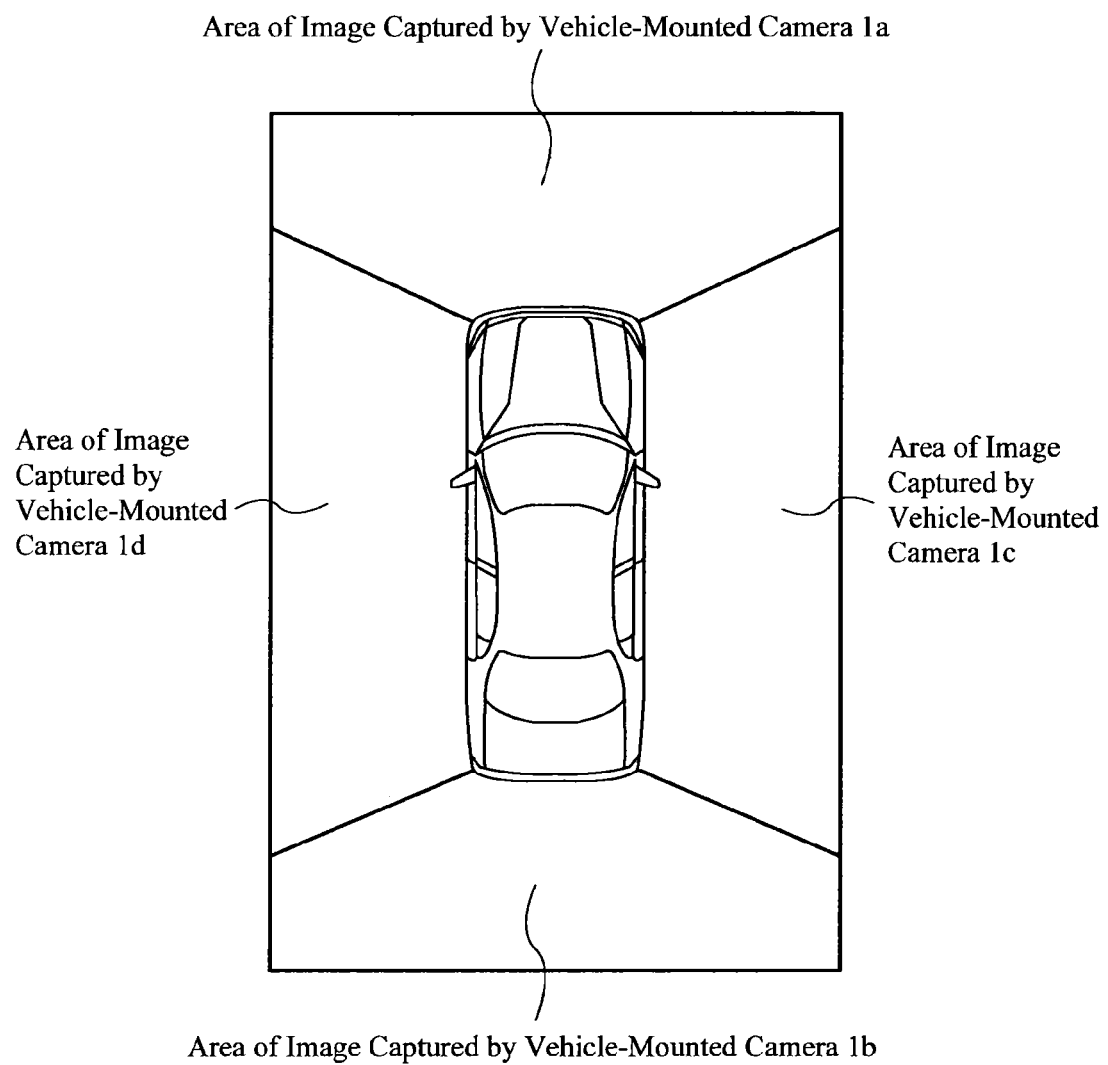
FIG. 6 is an explanatory drawing showing the areas of images captured by vehicle-mounted cameras 1a to 1d.

FIG. 1 is a block diagram showing an image synthesis device in accordance with Embodiment 1 of the present invention. Referring to FIG. 1, a vehicle-mounted camera 1a is mounted to a front portion of a vehicle (this term "vehicle" includes not only cars but also trains, ships, airplanes, and so on), and captures an area in front of the vehicle and outputs image data showing an image of the area in front of the vehicle to an input video signal control unit 4. A vehicle-mounted camera 1b is mounted to a rear portion of the vehicle, and captures an area in rear of the vehicle and outputs image data showing an image of the area in rear of the vehicle to the input video signal control unit 4. A vehicle-mounted camera 1c is mounted to a right side portion of the vehicle, and captures an area on a right side of the vehicle and outputs image data showing an image of the area on the right side of the vehicle to the input video signal control unit 4. A vehicle-mounted camera 1d is mounted to a left side portion of the vehicle, and captures an area on a left side of the vehicle and outputs image data showing an image of the area on the left side of the vehicle to the input video signal control unit 4. FIG. 6 is an explanatory drawing showing the area of the image captured by each of the vehicle-mounted cameras 1a to 1d.

A rearrangement table storing buffer 2 is a recording medium, such as a RAM or a hard disk, for example. For each point of view which can be specified, the rearrangement table storing buffer stores a rearrangement table in which camera information showing a vehicle-mounted camera 1 corresponding to each fine area which constructs a bird's-eye view image viewed from the point of view, area information showing an area in an image captured by the vehicle-mounted camera 1, the area corresponding to the bird's-eye view image, and a coordinate transformation matrix used for converting the image captured by the vehicle-mounted camera 1 into the bird's-eye view image are recorded. For example, in a case in which the number of points of view each of which can be specified is 100 and the number of fine areas which construct a bird's-eye view image viewed from each point of view is 200 in the image synthesis device, 20,000 (=100×200) rearrangement tables are stored in the rearrangement table storing buffer 2 as rearrangement tables which respectively correspond to the fine areas. The rearrangement table storing buffer 2 constructs a table storing unit.

An area determining unit 3 consists of a semiconductor integrated circuit, a one chip microcomputer, a personal computer or the like in which a CPU is mounted, for example. The area determining unit 3 carries out a process of referring to the rearrangement tables stored in the rearrangement table storing buffer 2 when receiving viewpoint position information showing the point of view of a bird's-eye view image to select a vehicle-mounted camera 1 used for generation of a bird's-eye view image viewed from the point of view shown by the viewpoint position information from the vehicle-mounted cameras 1a to 1d, determining an area corresponding to the bird's-eye view image in the image captured by the vehicle-mounted camera 1, and outputting required area information showing the area to the input video signal control unit 4. The area determining unit 3 constructs an area determining unit.

The input video signal control unit 4 consists of a semiconductor integrated circuit, a one chip microcomputer, a personal computer or the like in which a CPU is mounted, for example. The input video signal control unit 4 carries out a process of receiving image data (front camera data, right camera data, left camera data, or rear camera data) about the area shown by the required area information outputted from the area determining unit 3, the image data being included in the image data showing the images captured by the vehicle-mounted cameras 1a to 1d, and storing the image data in an input frame buffer 5. The input video signal control unit 4 constructs an image data input unit.

The input frame buffer 5 is a recording medium, such as a frame memory, and stores the image data (front camera data, right camera data, left camera data, or rear camera data) about the area outputted from the input video signal control unit 4 therein.

An image processing device 6 consists of a GPU (Graphics Processing Unit) or the like, for example. The image processing device 6 carries out a process of carrying out a coordinate transformation on the image shown by the image data stored in the input frame buffer 5 by using a coordinate transformation matrix in a rearrangement table stored in the rearrangement table storing buffer 2 to generate a bird's-eye view image. The image processing device 6 constructs a bird's-eye view image generating unit.

An output frame buffer 7 is a recording medium, such as a frame memory, and stores the bird's-eye view image generated by the image processing device 6. An image display device 8 is a display unit in which a liquid crystal display or the like is mounted, and carries out a process of displaying the bird's-eye view image stored in the output frame buffer 7. The image display device 8 constructs an image display unit. Although in the example of FIG. 1 the image display device 8 is disposed outside the image synthesis device, the image synthesis device can install the image display device 8 therein.

Although it is assumed in the example of FIG. 1 that the rearrangement table storing buffer 2, the area determining unit 3, the input video signal control unit 4, the input frame buffer 5, the image processing device 6, and the output frame buffer 7, which are the components of the image synthesis device, consist of pieces of hardware for exclusive use, respectively, the image synthesis device can alternatively consist of a computer. In this case, a program in which the processes carried out by the rearrangement table storing buffer 2, the area determining unit 3, the input video signal control unit 4, the input frame buffer 5, the image processing device 6, and the output frame buffer 7 are described can be stored in a memory of the computer, and a CPU of the computer can be made to execute the program stored in the memory. FIG. 2 is a flow chart showing the processing carried out by the image synthesis device in accordance with Embodiment 1 of the present invention.

FIG. 3 is an explanatory drawing showing an example of a point of view and a rearrangement table. In the image synthesis device, rearrangement tables whose number is equal to the number of fine areas which construct a bird's-eye view image viewed from each point of view which can be specified are prepared in advance. For example, in the case in which the number of point of views each of which can be specified is 100 and the number of fine areas which construct a bird's-eye view image viewed from each point of view is 200, 20,000 (=100×200) rearrangement tables are prepared in advance. FIG. 3(a) shows a bird's-eye view image viewed from a point of view, and each triangle in the bird's-eye view image shows a fine area which constructs the bird's-eye view image (in the example of FIG. 3(a), although the shape of each of the fine areas is a triangle, each of the fine areas can have whatever shape. For example, each of the fine areas can be a rectangle). In the rearrangement table, for each of the fine areas which construct the bird's-eye view image viewed from the point of view, camera information showing the vehicle-mounted camera 1 corresponding to the point of view is recorded. In the example of FIG. 3(b), the rearrangement table shows that the vehicle-mounted camera 1 corresponding to the 0th fine area is the "vehicle-mounted camera 1a", and the vehicle-mounted camera 1 corresponding to the nth fine area is the "vehicle-mounted camera 1c."

Further, in the rearrangement table, area information showing the area in the image captured by the vehicle-mounted camera 1, the area corresponding to the bird's-eye view image viewed from the point of view, is recorded, that is, area information showing each fine area which constructs the bird's-eye view image viewed from the point of view is recorded (e.g., vertex coordinates (u0(n), v0(n)), (u1(n), v1(n)), and (u2(n), v2(n)) are recorded for the nth fine area). In the example of FIG. 3(b), the rearrangement table shows that (u0(n), v0(n)) is (200, 100), (u1(n), v1(n)) is (200, 105), and (u2(n), v2(n)) is (205, 105).

Further, in the rearrangement table, a coordinate transformation matrix M(n) used for converting the image captured by the vehicle-mounted camera 1 into the bird's-eye view image (a matrix used for carrying out a coordinate transformation between a coordinate system u-v of the captured image and a coordinate system x-y of the bird's-eye view image) is recorded.

$$M(n) = \begin{pmatrix} a & b \\ c & d \end{pmatrix} \quad (1)$$

The components a, b, c, and d of the coordinate transformation matrix M(n) are constants determined by the mounting position and the capturing direction of each of the vehicle-mounted cameras 1a to 1d, the point of view of the bird's-eye view image, and enlargement/reduction of the image. For example, when converting the image captured by the vehicle-mounted camera 1 into the bird's-eye view image by rotating the image by an angle theta around an X-axis, the coordinate transformation matrix M(n) can be given by the following equation (2).

$$M(n) = \begin{pmatrix} \cos\theta & \sin\theta \\ -\sin\theta & \cos\theta \end{pmatrix} \quad (2)$$

As an alternative, when converting the image captured by the vehicle-mounted camera 1 into the bird's-eye view image by rotating the image by an angle theta around a Y-axis, the coordinate transformation matrix M(n) can be given by the following equation (3).

$$M(n) = \begin{pmatrix} \cos\theta & -\sin\theta \\ \sin\theta & \cos\theta \end{pmatrix} \quad (3)$$

The coordinate transformation matrix M(n) shown in equation (2) and that shown in equation (3) are only examples, and another coordinate transformation matrix can be alternatively used. Although in this embodiment the example of converting the image captured by the vehicle-mounted camera 1 into the bird's-eye view image by rotating the image by an angle theta is shown, this embodiment is not limited to this example. For example, there can be a case of converting the image captured by the vehicle-mounted camera 1 into the bird's-eye view image by carrying out a parallel translation on the image, and a case of converting the image captured by the vehicle-mounted camera 1 into the bird's-eye view image by enlarging or reducing the image. In these cases, what is necessary is just to use a coordinate transformation matrix M(n) corresponding to one of these transformations.

Next, the operation of the image synthesis device will be explained. When receiving viewpoint position information showing a point of view of a bird's-eye view image to be generated (for example, a user is allowed to input the viewpoint position information by operating a not-shown man machine interface (e.g., a mouse, a keyboard, or a touch panel) to specify a desired point of view of a bird's-eye view image) (step ST1 of FIG. 2), the area determining unit 3 determines whether or not the point of view of the bird's-eye view image is changed from a current one (step ST2).

When the point of view of the bird's-eye view image is changed from the current one (including the time that a point of view of a bird's-eye view image is specified for the first time), the area determining unit 3 searches through the plurality of rearrangement tables stored in the rearrangement table storing buffer 2 for the rearrangement table corresponding to each fine area which constructs the bird's-eye view image viewed from the point of view. After searching for the rearrangement table corresponding to each fine area, the area determining unit 3 refers to the camera information recorded in the rearrangement table to select the vehicle-mounted camera 1 which is used for generation of the bird's-eye view image viewed from the point of view shown by the viewpoint position information from the vehicle-mounted cameras 1a to 1d (step ST3).

For example, when the camera information recorded in the rearrangement table shows the "vehicle-mounted camera 1a", the area determining unit selects the vehicle-mounted camera 1a as the vehicle-mounted camera 1 which is used for generation of the bird's-eye view image, and, when the camera information recorded in the rearrangement table shows the "vehicle-mounted camera 1b", selects the vehicle-mounted camera 1b as the vehicle-mounted camera 1 which is used for generation of the bird's-eye view image. In the case of FIG. 3(a), because the camera information shows the "vehicle-mounted camera 1c" in each fine area on the right side of the vehicle, for example, the area determining unit selects the vehicle-mounted camera 1c as the vehicle-mounted camera 1 which is used for generation of the bird's-eye view image, and, because the camera information shows the "vehicle-mounted camera 1d" in each fine area on the left side of the vehicle, for example, the area determining unit selects the vehicle-mounted camera 1d as the vehicle-mounted camera 1 which is used for generation of the bird's-eye view image.

After selecting one vehicle-mounted camera 1 which is used for generation of the bird's-eye view image, the area determining unit 3 refers to the area information recorded in the rearrangement table to determine the area corresponding to the bird's-eye view image in the image captured by the vehicle-mounted camera 1, and outputs the required area information showing the area to the input video signal control unit 4 (step ST4).

Figure 4:
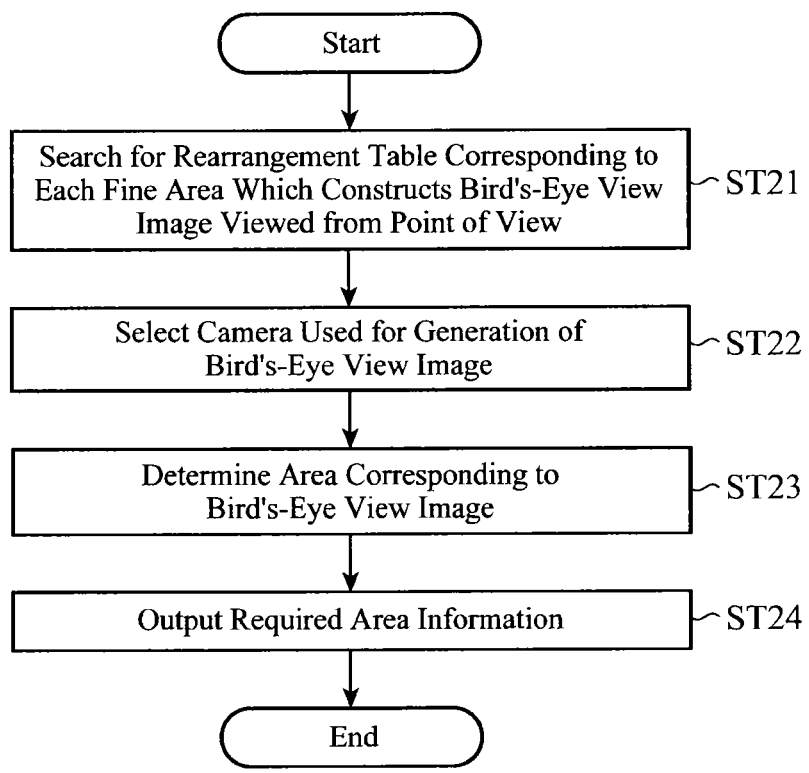
FIG. 4 is a flow chart showing a process of determining an area in a captured image which corresponds to a bird's-eye view image, the process being carried out by an area determining unit 3.
Figure 5:
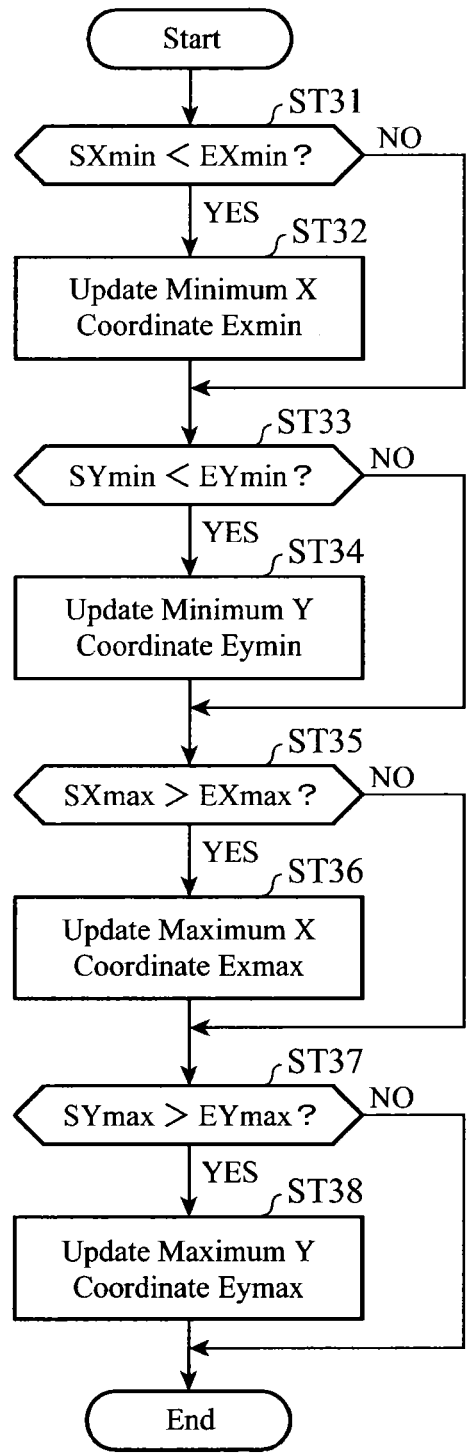
FIG. 5 is a flow chart showing a process of updating a currently-set area corresponding to a bird's-eye view image.

Hereafter, the process of determining the area in the captured image which corresponds to the bird's-eye view image, the process being carried out by the area determining unit 3, will be explained concretely. The process of determining the area, which will be shown hereafter, is only an example, and the area determining unit can alternatively determine the area in the captured image which corresponds to the bird's-eye view image by carrying out another determining process. FIG. 4 is a flow chart showing the process of determining the area in the captured image which corresponds to the bird's-eye view image, the process being carried out by the area determining unit 3. Further, FIG. 5 is a flow chart showing a process of updating the currently-set area corresponding to the bird's-eye view image.

When receiving the viewpoint position information showing the point of view of the bird's-eye view image to be generated, and the point of view shown by the viewpoint position information is changed from the current one or the point of view of the bird's-eye view image is specified for the first time, the area determining unit 3 searches through the plurality of rearrangement tables stored in the rearrangement table storing buffer 2 for the rearrangement table corresponding to each fine area which constructs the bird's-eye view image viewed from the point of view shown by the viewpoint position information, as mentioned above (step ST21 of FIG. 4).

After searching for the rearrangement table corresponding to each fine area which constructs the bird's-eye view image viewed from the point of view, the area determining unit 3 selects the vehicle-mounted camera 1 which is used for generation of the bird's-eye view image viewed from the point of view shown by the viewpoint position information from the vehicle-mounted cameras 1a to 1d with reference to the camera information recorded in the rearrangement table corresponding to the fine area (step ST22). In the example of FIG. 3, the area determining unit selects each of the vehicle-mounted cameras 1a, 1b, 1c, and 1d as the vehicle-mounted camera 1 used for generation of the bird's-eye view image.

After selecting one vehicle-mounted camera 1 which is used for generation of the bird's-eye view image, the area determining unit 3 refers to the area information recorded in the rearrangement table corresponding to each fine area to determine the vertex coordinates of the area corresponding to the bird's-eye view image in the image captured by the vehicle-mounted camera 1 (step ST23). For example, when processing the nth fine area, the area determining unit selects the vehicle-mounted camera 1c as the vehicle-mounted camera 1 used for generation of the bird's-eye view image, and determines (u0(n), v0(n)), (u1(n), v1(n)), and (u2(n), v2(n)) in the image captured by the vehicle-mounted camera 1c as the vertex coordinates of the area corresponding to the bird's-eye view image. In the example of FIG. 3(b), (u0(n), v0(n)) is (200, 100), (u1(n), v1(n)) is (200, 105), and (u2(n), v2(n)) is (205, 105).

After determining the vertex coordinates of each area corresponding to the bird's-eye view image, the area determining unit 3 outputs the vertex coordinates of the area to the input video signal control unit 4 as the required area information showing the area corresponding to the bird's-eye view image (step ST24). When outputting the required area information to the input video signal control unit 4, the area determining unit 3 includes the camera information showing the vehicle-mounted camera 1 which is used for generation of the bird's-eye view image (i.e., the camera information recorded in the rearrangement table corresponding to each fine area which constructs the bird's-eye view image viewed from the point of view) in the required area information, and outputs the required area information to the input video signal control unit 4. As an alternative, the area determining unit can output the camera information, separately from the required area information, to the input video signal control unit 4.

Although in this embodiment the example in which the area determining unit 3 outputs the vertex coordinates of each area corresponding to the bird's-eye view image to the input video signal control unit 4 as the required area information showing the area is shown, the area determining unit can alternatively perform the following process.

More specifically, the area determining unit 3 compares the area which the area determining unit determines this time and which corresponds to the bird's-eye view image with the area which the area determining unit has determined the last time and which corresponds to the bird's-eye view image (i.e., the currently-set area corresponding to the bird's-eye view image (simply referred to as the "currently-set area" from here on)) to determine whether or not the area which the area determining unit determines this time and which corresponds to the bird's-eye view image is included in the range of the currently-set area. When then determining that the area which the area determining unit determines this time and which corresponds to the bird's-eye view image is not included in the range of the currently-set area, the area determining unit 3 updates the currently-set area in the following way, and outputs the coordinates showing the set area updated (i.e., the minimum X coordinate, the maximum X coordinate, the minimum Y coordinate, and the maximum Y coordinate of the set area) to the input video signal control unit 4 as the required area information showing the area corresponding to the bird's-eye view image.

Process of Updating the Set Area Which is Carried Out by the Area Determining Unit 3

When the minimum X coordinate SXmin of the area determined this time and corresponding to the bird's-eye view image is smaller than the minimum X coordinate EXmin of the currently-set area (step ST31 of FIG. 5), the area determining unit 3 updates the minimum X coordinate EXmin of the set area to the minimum X coordinate SXmin (step ST32). When the minimum Y coordinate SYmin of the area determined this time and corresponding to the bird's-eye view image is smaller than the minimum Y coordinate EYmin of the currently-set area (step ST33), the area determining unit 3 updates the minimum Y coordinate EYmin of the set area to the minimum Y coordinate SYmin (step ST34).

When the maximum X coordinate SXmax of the area determined this time and corresponding to the bird's-eye view image is larger than the maximum X coordinate EXmax of the currently-set area (step ST35), the area determining unit 3 updates the maximum X coordinate EXmax of the set area to the maximum X coordinate SXmax (step ST36). When the maximum Y coordinate SYmax of the area determined this time and corresponding to the bird's-eye view image is larger than the maximum Y coordinate EYmax of the currently-set area (step ST37), the area determining unit 3 updates the maximum Y coordinate EYmax of the set area to the maximum Y coordinate SYmax (step ST38).

When receiving the required area information showing each area corresponding to the bird's-eye view image from the area determining unit 3, the input video signal control unit 4 receives the image data in the area shown by the required area information (i.e., the image data in the set area), the image data being included in the image data showing the image captured by the vehicle-mounted camera 1 shown by the camera information included in the required area information (e.g., when the vehicle-mounted camera 1c is selected as the vehicle-mounted camera 1 used for generation of the bird's-eye view image, the image data showing the image captured by the vehicle-mounted camera 1*c*), and stores the image data in the input frame buffer 5 (step ST5 of FIG. 2).

After the input video signal control unit 4 stores the image data in the input frame buffer 5, the image processing device 6 carries out a coordinate transformation on the image shown by the image data stored in the input frame buffer 5 by using the coordinate transformation matrix M(n) in the rearrangement table (i.e., the rearrangement table corresponding to each fine area which constructs the bird's-eye view image viewed from the point of view shown by the viewpoint position information) stored in the rearrangement table storing buffer 2 to generate the bird's-eye view image (step ST6). More specifically, the image processing device 6 transforms the coordinates (u(n), v(n)) of each pixel in the image shown by the image data stored in the input frame buffer 5 into the coordinates (x(n), y(n)) of a corresponding pixel on the bird's-eye view image by using the coordinate transformation matrix M(n) shown in the above-mentioned equation (1) to generate the bird's-eye view image.

$$\begin{pmatrix} x(n) \\ y(n) \end{pmatrix} = M(n) \cdot \begin{pmatrix} u(n) \\ v(n) \end{pmatrix} \quad (4)$$

$$= \begin{pmatrix} a & b \\ c & d \end{pmatrix} \begin{pmatrix} u(n) \\ v(n) \end{pmatrix}$$

After generating the bird's-eye view image viewed from the point of view shown by the viewpoint position information, the image processing device 6 stores the bird's-eye view image in the output frame buffer 7 (step ST7). After the image processing device 6 stores the bird's-eye view image in the output frame buffer 7, the image display device 8 displays the bird's-eye view image on the display or the like (step ST8).

Although the image synthesis device shifts to the process of step ST10 when continuing displaying the bird's-eye view image, the image synthesis device ends the series of processes when a signal or the like to request an end of the display of the bird's-eye view image is inputted thereto (step ST9). When newly receiving viewpoint position information during the continuous display of the bird's-eye view image before a predetermined time interval has elapsed after the image display device 8 has displayed the bird's-eye view image (step ST10), the area determining unit 3 determines whether or not the point of view of the bird's-eye view image is changed from the current one (step ST2). More specifically, the area determining unit 3 compares the point of view shown by the viewpoint position information which is inputted the last time with the point of view shown by the viewpoint position information which is inputted this time to determine whether or not the point of view of the bird's-eye view image is changed from the current one.

When the point of view of the bird's-eye view image is changed from the current one, the image synthesis device carries out the processes in above-mentioned steps ST3 to ST8 in order to generate and display the bird's-eye view image viewed from the changed point of view. In contrast, because the areas required for generation of the bird's-eye view image are not changed when the point of view of the bird's-eye view image is not changed from the current one or when no new viewpoint position information is inputted before the predetermined time interval has elapsed, the image synthesis device skips the processes of steps ST3 and ST4, shifts to the process of step ST5, and carries out the above-mentioned processes of steps ST5 to ST8. In this case, the input video signal control unit 4 newly receives the image data in the area shown by the required area information which is outputted the last time from the area determining unit 3 (i.e., the image data in the set area), and stores the image data in the input frame buffer 5.

As can be seen from the above description, because the image synthesis device in accordance with this Embodiment 1 is constructed in such a way that the image synthesis device includes the area determining unit 3 for selecting a vehicle-mounted camera 1 used for generation of a bird's-eye view image viewed from an arbitrary point of view from the vehicle-mounted cameras 1*a* to 1*d* mounted at different positions, and for determining an area corresponding to the bird's-eye view image in an image captured by the vehicle-mounted camera 1, and the input video signal control unit 4 for receiving image data about the area determined by the area determining unit 3, the image data being included in image data showing the image captured by the vehicle-mounted camera 1, to store the image data in the input frame buffer 5, and the image processing device 6 generates the bird's-eye view image from the image data stored in the input frame buffer 5, there is provided an advantage of being able to generate a bird's-eye view image having high quality and a high frame rate without having to install an input frame buffer 5 having a large memory size.

Further, because the image synthesis device in accordance with this Embodiment 1 is constructed in such a way that every time when the point of view of the bird's-eye view image is changed from the current one, the area determining unit 3 carries out the process of determining an area corresponding to the bird's-eye view image viewed from the new point of view, and provides the required area information showing the area to the input video signal control unit 4, there is provided an advantage of being able to accept a change in the point of view of the bird's-eye view image without causing any increase in the memory size of the input frame buffer 5.

The image synthesis device in accordance with this Embodiment 1 selects two or more vehicle-mounted cameras 1 which are used for generation of the bird's-eye view image from the plurality of vehicle-mounted cameras 1*a* to 1*d*, and, when generating the bird's-eye view image by carrying out a coordinate transformation on each of the images shown by the plurality of image data stored in the input frame buffer 5, the image processing device 6 composites a plurality of images (bird's-eye view images) on each of which the coordinate transformation is carried out into a final bird's-eye view image. Whatever method of compositing the plurality of images is used. Because a known method can be used to composite the plurality of images, the detailed explanation of the method will be omitted hereafter.

Further, although in this Embodiment 1 the plurality of vehicle-mounted cameras 1*a* to 1*d* are mounted to a peripheral portion of a vehicle, and the image processing device 6 generates a bird's-eye view image viewed from an arbitrary point of view in the neighborhood of the vehicle from the image data stored in the input frame buffer 5, as previously mentioned, the plurality of cameras are not necessarily mounted to a peripheral portion of a vehicle. For example, the plurality of cameras can be mounted to a peripheral portion of a building, or the like.

Further, although in this Embodiment 1 the four vehicle-mounted cameras 1*a* to 1*d* are mounted to a peripheral portion of a vehicle, whatever number of vehicle-mounted cameras 1 can be mounted.

Embodiment 2

Although in above-mentioned Embodiment 1 the image synthesis device in which the rearrangement table storing buffer 2, the input frame buffer 5, and the output frame buffer 7 are installed is shown, a common memory, instead of the rearrangement table storing buffer 2, the input frame buffer 5, and the output frame buffer 7, can be installed in the image synthesis device in order to make a cost reduction in the image synthesis device.

Figure 7:
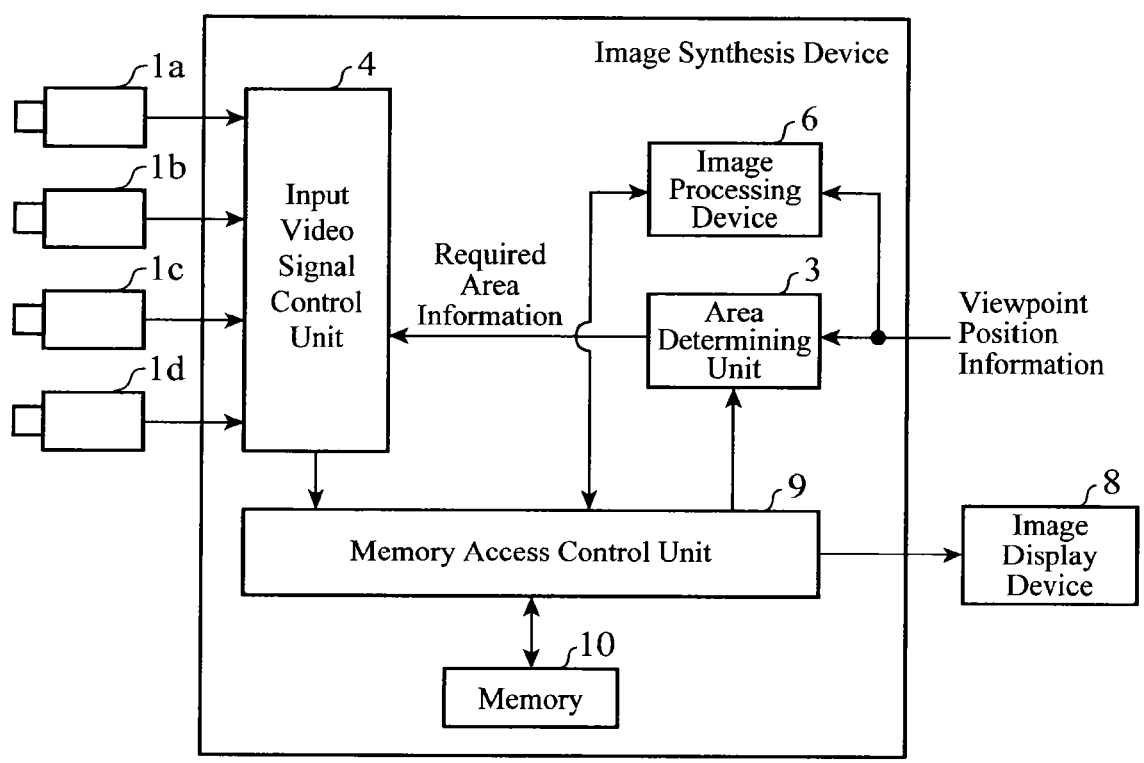
FIG. 7 is a block diagram showing an image synthesis device in accordance with Embodiment 2 of the present invention.

FIG. 7 is a block diagram showing an image synthesis device in accordance with Embodiment 2 of the present invention. In the figure, because the same reference numerals as those shown in FIG. 1 denote the same components or like components, the explanation of the components will be omitted hereafter. A memory access control unit 9 consists of a semiconductor integrated circuit, a one chip microcomputer, a personal computer, or the like in which a CPU is installed, and carries out a process of writing image data outputted from an input video signal control unit 4 (i.e., image data in an area shown by required area information) in a memory 10, and also writing a bird's-eye view image outputted from an image processing device 6 in the memory 10, and further carries out a process of reading a rearrangement table stored in the memory 10 and outputting the rearrangement table to an area determining unit 3 and the image processing device 6, and also reading the bird's-eye view image stored in the memory 10 and outputting the bird's-eye view image to an image display device 8. The memory 10 is a recording medium, such as a RAM or a hard disk, and stores the rearrangement table, the image data, and the bird's-eye view image.

Although it is assumed in the example of FIG. 7 that the area determining unit 3, the input video signal control unit 4, the image processing device 6, the memory access control unit 9, and the memory 10, which are the components of the image synthesis device, consist of pieces of hardware for exclusive use, respectively, the image synthesis device can alternatively consist of a computer. In this case, a program in which the processes carried out by the area determining unit 3, the input video signal control unit 4, the image processing device 6, the memory access control unit 9, and the memory 10 are described can be stored in a memory of the computer, and a CPU of the computer can be made to execute the program stored in the memory.

Next, the operation of the image synthesis device will be explained. When receiving viewpoint position information showing a point of view of a bird's-eye view image to be generated, the area determining unit 3 determines whether or not the point of view of the bird's-eye view image is changed from a current one, like that in accordance with above-mentioned Embodiment 1 (step ST1 of FIG. 2) (step ST2).

When the point of view of the bird's-eye view image is changed from the current one (including the time that a point of view of a bird's-eye view image is specified for the first time), the area determining unit 3 searches through a plurality of rearrangement tables stored in the memory 10 via the memory access control unit 9 for the rearrangement table corresponding to each fine area which constructs the bird's-eye view image viewed from the point of view. After searching for the rearrangement table corresponding to each fine area, the area determining unit 3 refers to the camera information recorded in the rearrangement table to select the vehicle-mounted camera 1 which is used for generation of the bird's-eye view image viewed from the point of view shown by the viewpoint position information from vehicle-mounted cameras 1a to 1d (step ST3).

After selecting one vehicle-mounted camera 1 which is used for generation of the bird's-eye view image, the area determining unit 3 refers to the area information recorded in the rearrangement table to determine the area corresponding to the bird's-eye view image in the image captured by the vehicle-mounted camera 1, and outputs the required area information showing the area to the input video signal control unit 4 (step ST4). When outputting the required area information to the input video signal control unit 4, the area determining unit 3 includes the camera information showing the vehicle-mounted camera 1 which is used for generation of the bird's-eye view image (i.e., the camera information recorded in the rearrangement table corresponding to each fine area which constructs the bird's-eye view image viewed from the point of view) in the required area information, and outputs the required area information to the input video signal control unit 4. As an alternative, the area determining unit can output the camera information, separately from the required area information, to the input video signal control unit 4.

When receiving the required area information showing each area corresponding to the bird's-eye view image from the area determining unit 3, the input video signal control unit 4 receives the image data in the area shown by the required area information (i.e., the image data in the set area), the image data being included in the image data showing the image captured by the vehicle-mounted camera 1 shown by the camera information included in the required area information, like that in accordance with above-mentioned Embodiment 1. The input video signal control unit 4 then stores the image data in the set area in the memory 10 via the memory access control unit 9 (step ST5).

When the input video signal control unit 4 stores the image data in the set area in the memory 10 via the memory access control unit 9, the image processing device 6 reads the rearrangement table (i.e., the rearrangement table corresponding to each fine area which constructs the bird's-eye view image viewed from the point of view shown by the viewpoint position information) stored in the memory 10 via the memory access control unit 9, and also reads the image data in the set area stored in the memory 10. The image processing device 6 then carries out a coordinate transformation on the image shown by the image data by using a coordinate transformation matrix M(n) recorded in the rearrangement table to generate the bird's-eye view image (step ST6). More specifically, the image processing device 6 transforms the coordinates (u(n), v(n)) of each pixel in the image shown by the image data stored in the memory 10 into the coordinates (x(n), y(n)) of a corresponding pixel on the bird's-eye view image by using the coordinate transformation matrix M(n) shown in the above-mentioned equation (1) to generate the bird's-eye view image.

After generating the bird's-eye view image viewed from the point of view shown by the viewpoint position information, the image processing device 6 stores the bird's-eye view image in the memory 10 via the memory access control unit 9 (step ST7). After the image processing device 6 stores the bird's-eye view image in the memory 10 via the memory access control unit 9, the image display device 8 reads the bird's-eye view image stored in the memory 10 via the memory access control unit 9 and displays the bird's-eye view image on a display or the like (step ST8).

Although the image synthesis device shifts to the process of step ST10 when continuing displaying the bird's-eye view image, the image synthesis device ends the series of processes when a signal or the like to request an end of the display of the bird's-eye view image is inputted thereto (step ST9). When newly receiving viewpoint position information during the continuous display of the bird's-eye view image before a predetermined time interval has elapsed after the image display device 8 has displayed the bird's-eye view image (step ST10), the area determining unit 3 determines whether or not the point of view of the bird's-eye view image is changed from the current one (step ST2). More specifically, the area determining unit 3 compares the point of view shown by the viewpoint position information which is inputted the last time with the point of view shown by the viewpoint position information which is inputted this time to determine whether or not the point of view of the bird's-eye view image is changed from the current one.

When the point of view of the bird's-eye view image is changed from the current one, the image synthesis device carries out the processes in above-mentioned steps ST3 to ST8 in order to generate and display the bird's-eye view image viewed from the changed point of view. In contrast, because the areas required for generation of the bird's-eye view image are not changed when the point of view of the bird's-eye view image is not changed from the current one or when no new viewpoint position information is inputted before the predetermined time interval has elapsed, the image synthesis device skips the processes of steps ST3 and ST4, shifts to the process of step ST5, and carries out the above-mentioned processes of steps ST5 to ST8. In this case, the input video signal control unit 4 newly receives the image data in the area shown by the required area information which is outputted the last time from the area determining unit 3 (i.e., the image data in the set area), and stores the image data in the memory 10 via the memory access control unit 9.

As can be seen from the above description, even in the case in which the common memory 10, instead of the rearrangement table storing buffer 2, the input frame buffer 5, and the output frame buffer 7, is installed in the image synthesis device in order to make a cost reduction in the image synthesis device, there is provided an advantage of being able to generate a bird's-eye view image having high quality and a high frame rate without causing any increase in the memory size.

INDUSTRIAL APPLICABILITY

The image synthesis device in accordance with the present invention is suitable for use as an image synthesis device that generates a bird's-eye view image viewed from an arbitrary point of view from images captured by a plurality of cameras.

The invention claimed is:

1. An image synthesis device comprising:
an area determining circuit to select a camera used for generation of a bird's-eye view image viewed from a designated point of view, the camera being selected from a plurality of cameras mounted at different positions, and to determine an area corresponding to said bird's-eye view image in an image captured by the selected camera;
an image data circuit to store, in a frame buffer, fine area image data corresponding to the area determined by said area determining circuit, said fine area image data being included in and a portion of captured image data showing the image captured by the selected camera; and
a bird's-eye view image generating circuit to generate the bird's-eye view image from the fine area image data stored in said frame buffer.

2. The image synthesis device according to claim 1, further comprising:
an image display circuit to display the bird's-eye view image generated by the bird's-eye view image generating circuit.

3. The image synthesis device according to claim 1, wherein:
the plurality of cameras are mounted to a vehicle, and
the bird's-eye view image generating circuit generates the bird's-eye view image with respect to the vehicle.

4. The image synthesis device according to claim 1, further comprising:
a table storing circuit to store rearrangement tables in each of which camera information showing a camera corresponding to a point of view of a bird's-eye view image, area information showing an area in an image captured by said camera, said area corresponding to said bird's-eye view image, and a coordinate transformation matrix used for converting an image captured by said camera into a bird's-eye view image are recorded is disposed,
wherein the area determining circuit refers to the rearrangement table stored in said table storing circuit when selecting the camera corresponding to the designated point of view and when determining the area corresponding to the bird's-eye view image to be generated.

5. The image synthesis device according to claim 4, wherein the bird's-eye view image generating circuit carries out a coordinate transform on the image shown by the area image data stored in the frame buffer by using a coordinate transformation matrix recorded in a rearrangement table to generate the bird's-eye view image.

6. The image synthesis device according to claim 1, wherein the area determining circuit carries out the process of determining the area corresponding to the bird's-eye view image every time when the designated point of view is changed, and provides a result of said area determining process for the image data input circuit.

7. The image synthesis device according to claim 1, wherein the area determining circuit receives, from outside of the image synthesis device, information indicating the point of view of the bird's-eye view image to be generated, and recognizes the designated point of view on a basis of the received information.

* * * * *